US010037322B2

(12) United States Patent
Copsey (10) Patent No.: US 10,037,322 B2
(45) Date of Patent: *Jul. 31, 2018

(54) SYSTEM AND METHOD FOR DOCUMENT DRIVEN ACTIONS (71) Applicant: Open Text SA ULC, Halifax (CA)

(72) Inventor: Simon Dominic Copsey, Horsham (GB)

(73) Assignee: Open Text SA ULC, Halifax, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/357,497

(22) Filed: Nov. 21, 2016

(65) Prior Publication Data
US 2017/0068668 A1 Mar. 9, 2017

Related U.S. Application Data (63) Continuation of application No. 14/193,230, filed on Feb. 28, 2014, now Pat. No. 9,529,799.

(60) Provisional application No. 61/783,920, filed on Mar. 14, 2013.

(51) Int. Cl.
*G06F 17/30* (2006.01)
*G06F 11/30* (2006.01)

(52) U.S. Cl.
CPC .... *G06F 17/30011* (2013.01); *G06F 11/3089* (2013.01); *G06F 17/30165* (2013.01)

(58) Field of Classification Search
CPC ........... G06F 17/30011; G06F 11/3089; G06F 17/30165; G06F 17/30
See application file for complete search history.

(56) References Cited

U.S. PATENT DOCUMENTS

| 6,499,110 | B1 | 12/2002 | Moses et al. |
|---|---|---|---|
| 6,862,602 | B2 | 3/2005 | Guha |
| 7,035,850 | B2 | 4/2006 | Arai |
| 7,289,643 | B2 | 10/2007 | Brunk et al. |
| 7,350,204 | B2 | 3/2008 | Lambert et al. |
| 7,516,240 | B2 | 4/2009 | Liskov et al. |
| 7,552,235 | B2 | 6/2009 | Chase et al. |
| 7,668,927 | B2 | 2/2010 | Fein et al. |
| 7,693,814 | B2 | 4/2010 | Margolus et al. |

(Continued)

OTHER PUBLICATIONS

Office Action issued for U.S. Appl. No. 14/193,230, dated Mar. 8, 2016, 16 pages.

(Continued)

*Primary Examiner* — Anh Ly
(74) *Attorney, Agent, or Firm* — Sprinkle IP Law Group (57) ABSTRACT

A system and method are disclosed for tracking documents in a computing environment, including documents stored locally on computing devices. A monitoring module stored on a computing device may determine that a user is trying to open a document stored locally on the computing device and communicate a signature associated with the document to a document tracking system. A document tracking system may compare the signature with a set of stored signatures to see if the document corresponds to a document already being tracked. If the document is not being tracked already, the document tracking system may upload the document into the system, send a link to a newer version or determine one or more actions to be performed on the document based on the signature.

20 Claims, 5 Drawing Sheets

(56) References Cited

U.S. PATENT DOCUMENTS

| | | |
|---|---|---|
| 7,822,201 B2 | 10/2010 | Shamoon et al. |
| 7,856,653 B2 | 12/2010 | Berger et al. |
| 7,904,941 B2 | 3/2011 | Jagadeesan et al. |
| 7,975,305 B2 | 7/2011 | Rubin et al. |
| 7,996,373 B1 | 8/2011 | Zoppas et al. |
| 8,312,023 B2 | 11/2012 | Shields et al. |
| 8,359,271 B2 | 1/2013 | Peckover |
| 8,713,418 B2 | 4/2014 | King et al. |
| 9,529,799 B2 | 12/2016 | Copsey |
| 2003/0084298 A1 | 5/2003 | Messerges et al. |
| 2003/0105739 A1 | 6/2003 | Essafi et al. |
| 2005/0273614 A1 | 12/2005 | Ahuja et al. |
| 2006/0029296 A1* | 2/2006 | King ............... H04N 1/00244 382/313 |
| 2007/0150948 A1 | 6/2007 | De Spiegeleer |
| 2007/0214169 A1 | 9/2007 | Audet et al. |
| 2007/0276823 A1 | 11/2007 | Borden et al. |
| 2008/0082827 A1 | 4/2008 | Agrawal et al. |
| 2008/0141117 A1 | 6/2008 | King et al. |
| 2009/0204586 A1 | 8/2009 | Takahashi |
| 2009/0235082 A1* | 9/2009 | Garrett ............... H04L 9/3281 713/178 |
| 2009/0248696 A1 | 10/2009 | Rowles et al. |
| 2010/0067031 A1 | 3/2010 | Greene |
| 2010/0088512 A1 | 4/2010 | Schwartz et al. |
| 2010/0223675 A1 | 9/2010 | Schneider |
| 2010/0287196 A1* | 11/2010 | Shields ............ G06F 17/30781 707/769 |
| 2011/0061112 A1 | 3/2011 | Berengoltz et al. |
| 2011/0078585 A1 | 3/2011 | King et al. |
| 2011/0162047 A1 | 6/2011 | Reeves et al. |
| 2012/0060082 A1* | 3/2012 | Edala ................ G06F 17/241 715/231 |
| 2013/0212151 A1* | 8/2013 | Herbach ............... H04L 67/42 709/203 |
| 2014/0280275 A1 | 9/2014 | Copsey |
| 2015/0143219 A1* | 5/2015 | McCabe ............... G06Q 10/10 715/224 |
| 2015/0150090 A1 | 5/2015 | Carroll et al. |

OTHER PUBLICATIONS

Notice of Allowance issued for U.S. Appl. No. 14/193,230, dated Aug. 10, 2016, 9 pages.

Shlomo Geva and Christopher M. De Vries, "TOPSIG: Topology Preserving Document Signatures," CIKM'11, Proceedings of the 20th ACM International Conference on Information and Knowledge Management, Oct. 24-28, 2011, Glasgow, Scotland, UK, pp. 333-338.

Praveen Rao and Bongki Moon, "An Internet-Scale Service for Publishing and Locating XML Documents," Published in: 2009 IEEE 25th International Conference on Data Engineering—Date of Conference: Mar. 29, 2009-Apr. 2, 2009, Shanghai, China pp. 1459-1462.

* cited by examiner

FIG. 1

| TRIGGER | ACTION |
|---|---|
| DOCUMENT: 0xA413 | DO NOT ALLOW MODIFICATION |
| DOCUMENT: 0xBC43, 0xEA45, 0x1139 | NOTIFY OF SOCIAL COMMUNITY LOCATED AT http://www.socialcommunities.com/1234.html |
| USER TYPE = DEVELOPER | DO NOT ALLOW DISTRIBUTION |
| USER ACCESSES > 10 IN 60 SECONDS | DISALLOW FURTHER DOCUMENT ACCESS NOTIFY SECURITY ADMINISTRATOR |

SYSTEM AND METHOD FOR DOCUMENT DRIVEN ACTIONS

RELATED APPLICATIONS

This application is a continuation of, and claims the benefit of priority under 35 U.S.C. 120 of the filing date of U.S. patent application Ser. No. 14/193,230 now U.S. Pat. No. 9,529,799, filed Feb. 28, 2014, entitled "SYSTEM AND METHOD FOR DOCUMENT DRIVEN ACTIONS," which claims a benefit of priority under 35 U.S.C. § 119 from U.S. Provisional Patent Application No. 61/783,920, filed Mar. 14, 2013, entitled "SYSTEM AND METHOD FOR DOCUMENT TRACKING AND DOCUMENT DRIVEN ACTIONS," which are hereby fully incorporated by reference herein.

TECHNICAL FIELD

This disclosure relates generally to systems and methods for tracking documents. Furthermore, this disclosure relates to systems and methods for use in both tracking documents and document driven actions.

BACKGROUND

Within any enterprise, regardless of the number of memos or instructions relating to document management or retention, there is the possibility that not every document gets stored in a designated storage system. A person may create a document and save it locally on their computing device without saving the document to a designated storage system such as a file server. This may create a problem if the computer having the only copy of a document crashes or the document is otherwise lost.

Distribution of a document may also lead to problems. A person may distribute a document through e-mail or other communications channel leading to duplicate copies of the document residing across a network. This can be problematic when documents are gathered (e.g., for legal compliance) as multiple copies of the same document may be collected, leading to increased use of storage resources to store the duplicate copies and processing resources to gather and de-duplicate the documents.

Furthermore, documents are sometimes distributed in a manner that relies on the recipient to handle the document properly with respect to compliance or workflow. For example, a user may forward a document to another user without specifically tying the document to a workflow process or without notifying the recipient that the document should not be forwarded outside of an entity's network. Consequently, it can be difficult for an enterprise to manage processes and ensure that documents are handled properly from the standpoint of compliance, workflow and other processes.

SUMMARY

Embodiments provide systems and methods for tracking and gathering documents from individual machines and storing the documents in a centralized or controlled system. Actions can be associated with the documents so that when a document is identified as accessed at a location, the appropriate actions may be implemented.

One embodiment comprises a method for document tracking, comprising maintaining a set of signatures corresponding to tracked documents and a set of associated actions. The method may further comprise receiving a document signature associated with a document from a client computing device, determining that the document signature is one of the set of signatures and determining an action associated with the document signature. The action associated with the document signature can be initiated.

Another embodiment can include a system for document driven actions that comprises a client computing device and a document tracking system. The client computing device can comprise a monitoring module configured to monitor the client computing device to detect attempts to open documents at the client computing device and in response to detecting an attempt to open a document, send a document signature to the document tracking system.

The document tracking system can be in communication with the monitoring module. The document tracking system can be configured to maintain a set of signatures corresponding to tracked documents and a set of associated actions, each action in the set of associated actions associated with a signature in the set of signatures. The document tracking system can receive the document signature from the monitoring module, determine that the document signature is one of the set of signatures and determine an action associated with the document signature. The document tracking system can initiate the action.

DETAILED DESCRIPTION

Systems and methods of document tracking and document driven actions and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of this disclosure will become apparent to those skilled in the art from this disclosure.

Before delving into more detail regarding the specific embodiments disclosed herein, some brief context may be helpful. In today's communication environment, the reliance on computing devices is growing ever greater. In particular, mobile computing devices (or just mobile devices) such as cellular phones, smart phones, laptops, PDA's, etc., are increasingly the way users conduct a wide variety of their business. Thus, users may utilize their computing devices to access a wide variety of data from a wide variety of content providers or sources. Furthermore, these users may save documents to their computing devices. These documents may be personal documents or they may be documents related to their work. For example, a user may create a draft of a document offline. The user may forward copies of the draft to colleagues for their review and comment, such that multiple copies of a document are at various computing devices in an environment.

In many cases, in particular environments (e.g., content management environments, etc.) it is desired to track the documents that are moving through that environment for a variety of reasons, such as, for example, security, version control, collaboration or other social community aspects, policy compliance, etc. The distributed and heterogeneous nature of such environments may, however, provide significant obstacles to attaining these desires. In particular, as documents may originate from within the environment, may originate externally to the environment but migrate into the environment, may be changed or communicated in a distributed manner using one or more devices within the environment, etc., it may be difficult to track documents within an environment and to take actions (e.g., security actions, policy actions, etc.) with respect to those documents.

It is thus desired to be able to track documents within an environment, and in particular to track documents within an environment unobtrusively. Embodiments can actively scan a computing device for documents or may intercept or otherwise determine that a document is on a computing device or in an environment when a user sends or otherwise shares the document.

Moreover, it may be desired to take actions in association with such documents. Any action taken may be based in part on the document. For example, if there is a document that has only one copy on one computing device in the environment, embodiments may track the document but leave the document on the user's computing device, whereas if there is a document with multiple copies throughout an environment, it may be desirable to gather those documents into a single repository and send links to allow the users to still access the document.

User interaction with a document may cause a computing device to perform an action associated with the document. A user may try to open a document about a product. Embodiments can recognize that the user is trying to open a document and provide documents to the user based on that action, or open a link to a social community about the product, bring up an information window, etc. A user opening a document may cause other documents to be opened or links to be generated. A user attempting to open a document may be informed that there is a later version of the document available.

To that end, attention is thus directed to the embodiments of the systems and methods for document tracking and document driven actions presented herein. Specifically, embodiments as disclosed may generate a signature of a document at a device and provide this signature to a document tracking system. Alternatively, in certain embodiments such a signature may be generated by the document tracking system itself. The received document signature may be compared to a set of signatures of known documents to determine if the document is known. Herein the term known, as used for example in conjunction with documents in an environment having a document tracking system, means that the document is being tracked within the environment and that for example, a signature has been previously generated or stored for the document in association with such a document tracking system.

If the document is known, it can be determined if there are any actions associated with the document and if so, these actions may be initiated or otherwise executed. If the document is unknown, it may be incorporated into the environment such that it may be tracked in the future or actions associated with the document. In some embodiments, if an e-mail received by a computing device in the environment has an attached document, the attached document may be scanned prior to downloading the document onto a computing device to determine if the document should be stored in a controlled repository. In some embodiments, if an e-mail is received by only a single user computing device, no scan is performed, but if multiple people receive the same e-mail or attachment then the documents are scanned.

More particularly, in one embodiment, a monitoring module may be present on the devices of users in an environment. When a document is accessed by a user (e.g., opened, downloaded, processed by an application, etc.) a monitoring module on the user's device may create a signature for that document. The signature may be sent to a centralized document tracking system that maintains a set of signatures of known documents within the environment. At the centralized document tracking system the received signature may be compared against the set of signatures of the known documents to determine if the document being accessed at the user's device is known within the environment. If the signature is one of the set of signatures of known document it can be determined if there is an action associated with the document signature, and these actions initiated or executed. Accordingly, in certain embodiments a signature is generated each time the document is accessed at a user device and action taken based on whether the generated signature is the same as a previously generated signature for the document stored in the document tracking system.

Such actions may include actions to be performed in association with the user's device from whom the signature was received. In these instances, a message with instructions to perform such an action may be sent to the monitoring application on the user's device which may initiate or execute such actions. The actions may also include actions which do not involve the user's device. In such cases, the centralized document tracking system may initiate or execute such actions.

If the signature received from the user's device at the centralized document tracking system is not one of the set of signatures maintained at the centralized document tracking system, a message with instruction to prompt the user to upload the document to a document management system may be sent to the monitoring module on the user's device (e.g., "This document is not stored in a document management system. Do you wish to store it now?"). Alternatively, such a message may instruct the monitoring module at the user's device to upload the document to a document management system substantially automatically.

It will be apparent after a review of the disclosures herein that almost any action desired may be implemented in the documents and that all such actions are contemplated for use with the embodiments disclosed herein or other embodiments and it should be understood that the examples of actions given herein are only provided by way of example.

For instance, actions taken with respect to known documents may relate to social collaboration or communities associated with a document, such as automatically providing a user access to a community for discussion of the document, linking a user to others (e.g., a community) involved with the document or who may provide assistance or input with respect to the documents, etc. These actions may also include actions related to the security of a document, such as preventing a user from opening or distributing a document or deleting such a document. In some embodiments, if multiple copies of a document are found on different computing devices, all copies may be gathered into a repository and a link may be provided to the computing devices.

Furthermore, the centralized document tracking system may maintain statistical data, which may or may not be associated with the document. Such statistical data may include, for example, how many accesses to a particular document have been received from user devices or a particular user device within a particular time period, how may accesses to document(s) have occurred from a particular user device, age of a document, etc. Actions associated with such statistical data may, for example, include denying access to a user to the document, denying a user any access, deleting documents over a certain age, etc.

As may be realized from the description, in addition to being able to associate actions with accesses to document, embodiments as disclosed may have the considerable advantage of being able to track documents regardless of the source or origin of such documents, the destination of such documents, etc. by virtue of having the ability to monitor content on all clients. No matter where a document originates, or where it is being communicated, the signature may be sent to the centralized document tracking system, even, for example, when the document is being held at a user device and is being sent to another mobile device.

In addition, the systems and methods presented herein may be accomplished substantially transparently to a user, as the monitoring module on the user's device may access a document, generate a signature from the document and provide the signature to the document tracking system substantially without user involvement, such that the document may be accessed by the user substantially as the document would normally be accessed and through the same applications through which the document would normally be accessed.

Accordingly, embodiments may be utilized in a wide variety of contexts and in conjunction with a wide variety of computing devices and environments. For example, while embodiments may be usefully applied to an environment with users at a mobile or desktop computing device that have access to documents in a document or content management system other embodiments may also be usefully applied to other environments without loss of generality.

Figure 1:
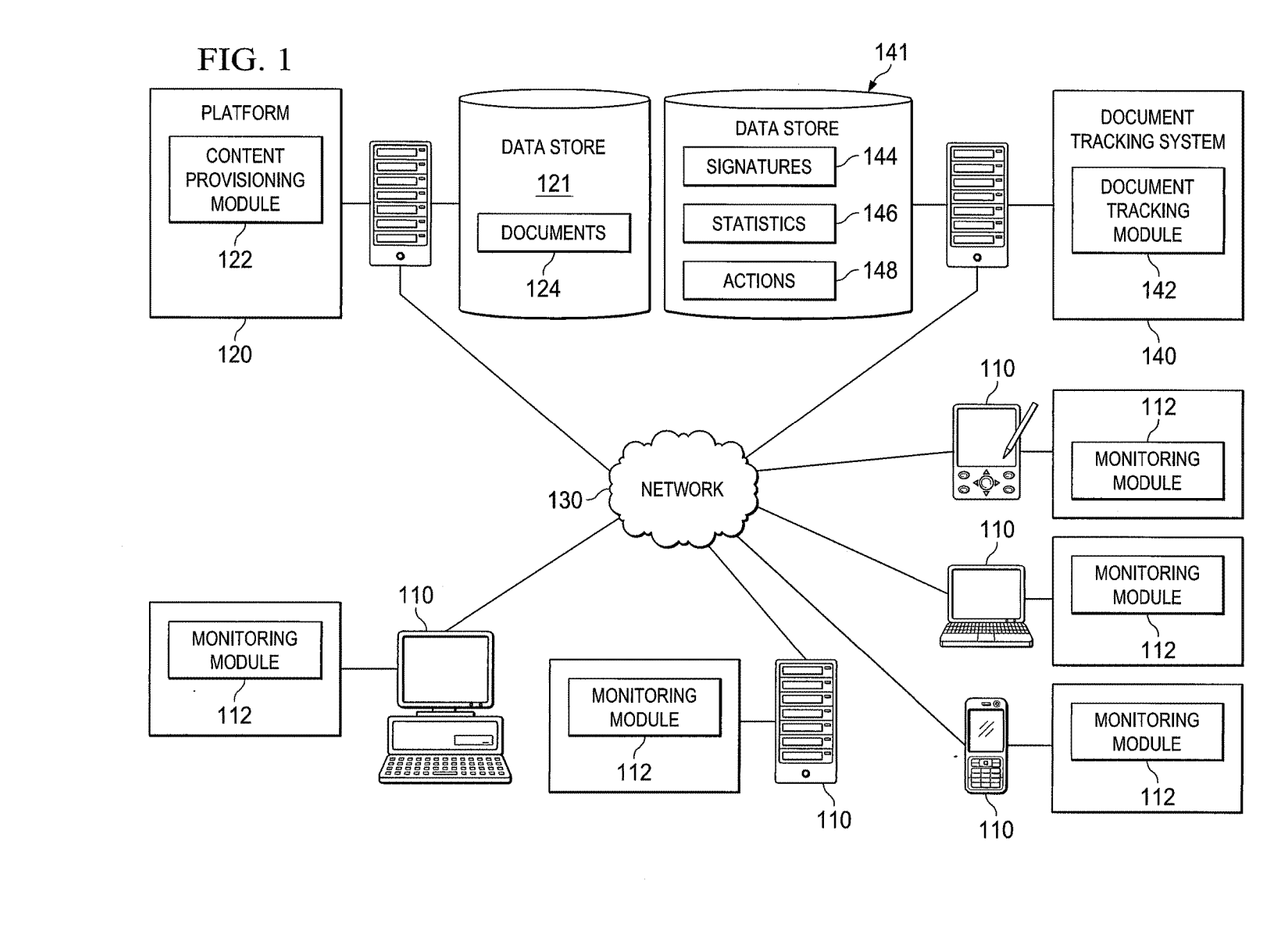
FIG. 1 is a block diagram illustrating one embodiment of a topology for document tracking and document driven actions.

FIG. 1 depicts one embodiment of topology for document tracking and document driven action. The topology includes one or more computing devices 110 connected to a content provisioning platform 120 and a document tracking system 140 over a network 130. The network 130 may be a wired or wireless network such as the Internet, an intranet, a LAN, a WAN, a cellular network, another type of network. It will be understood that network 130 may be a combination of multiple different kinds of wired or wireless networks.

Platform 120 may include one or more content provisioning modules 122 accessible at one or more locations (e.g., IP addresses or domain names) or through one or more interfaces. The modules of a particular platform 120 may be deployed on physical computing devices residing at a particular location (such as those associated with the provider of a particular mobile application) or may be deployed in a cloud. Thus, when a platform 120 is deployed in the cloud, one or more content provisioning modules 122 may be executing on a virtual machine provided in the cloud, where the virtual machine is addressable at a single (or more) location(s).

Regardless of the location of the platform 120, the content provisioning module 122 of a platform 120 may support access from a computing device 110. In other words, users at computing devices 110 may use their computing device 110 to access content provisioning module 122 using for example, a browser or other application on the computing device 110, a proprietary application on computing device, a generic interface, etc. In response to such access, content provisioning module 122 may provide data from data store 121 to the accessing computing device 110. This data may include documents 124, including for example, files in a proprietary format (e.g., Adobe .pdf, Microsoft Word, Excel, Power Point), files in a generic open format (e.g., mp3, mpeg, jpeg, etc.) files in a markup language (XML, HTML, etc.) or practically any other type of file. Thus, for example, content provisioning module 122 may be a content management system that provides access, control and management of documents 124.

Computing devices 110 may be mobile devices (such as smartphones, laptop computers, personal data assistants (PDAs), etc.) desktop computers, servers, or other computing platforms, or any other type of device that can process instructions and connect to network 130. Each computing device 110 may include a monitoring module 112. Monitoring module 112 may be installed on the device 110, for example, when the user is granted access to content provisioning module 122 or platform 120. In such a manner, any computing device 110 which has access to such documents 124 may have such a monitoring module 112 installed. It will be noted that data about computing device 110 or a user of computer device 110 may also be obtained and stored in the data store 121 when such a monitoring module 112 is installed (or at any later point as well, such as when a user logs into content provisioning module 122).

Monitoring module 112 can determine documents associated with a computing device 110 based on documents accessed at computing device 110. Monitoring module 112 may be configured to interact with the applications, operating system or hardware of the computing device 110 such that access to documents on the computing device 110 may be intercepted or otherwise monitored by the monitoring module 112 in order that documents accessed by the user on computing device 110 (e.g., downloaded or otherwise accessed through content provisioning module 122, downloaded from a website or other location using a browser on computing device 110, opened from a memory device such as a USB or hard disk drive, opened or downloaded from a received e-mail, etc.) may be received or accessed by monitoring module 112. In one embodiment, a computing device 110 may be configured (e.g., at startup) so that operating system requests to open or load files are redirected through monitoring module 112. Monitoring module 112 may also determine documents associated with the computing device 110 by scanning computing device 110 (e.g., by scanning the file system or otherwise).

According to one embodiment, a monitoring module 112 may be implemented as part of or in conjunction with programs used to connect to access restricted networks. For example, more mobile computing devices rely on virtual private networks (VPNs). In some embodiments, monitoring module 112 may be included as part of a VPN program to monitor documents that are accessed when a mobile device is connected to a VPN. In other embodiments, monitoring module may be running continually (e.g., as a background process) or may be otherwise implemented.

Monitoring module 112 may be configured to generate a signature for the document being accessed by the user or discovered on computing device 110. A signature for a document may be created by, for example, hashing the content (or a portion thereof) of the document. According to one embodiment, any hashing algorithm may be used, such as MD5 or other cryptographic hash, or mechanism for generating a unique signature over a document or portion of a document. It will be noted that multiple signatures 144 may be created from a document, for example, by hashing different portions of a document. Thus, for example, a signature may be created for every paragraph of a document, every page of a document, every heading of a document, etc.

Inspecting an entire document to generate a hash each time a document (or a version thereof) is brought into or accessed in a system may be very time consuming. In some embodiments, monitoring module 112 may extract a plurality of byte patterns from a document. These patterns may be used to determine if the document has been changed, without requiring the entire document be checked. The number of byte patterns or signatures may vary based on a security level for the document, how many processing resources are dedicated to verifying documents, or other considerations.

For example, if a 1 mB document is accessed, monitoring module 112 can store 20 4 byte patterns or sequences forming 20 signatures in a local cache. In other cases more or fewer signatures may be used having a larger or smaller number of bytes. When the document gets communicated out (e.g., via e-mail, uploading, saved to a file share, etc.), these patterns can be extracted and checked against the patterns in cache. If the patterns extracted match those in cache it is unlikely the document was changed and monitoring module 112 does not generate a new hash. The determination of whether there has been a change may be also be performed by a server application or other application. If monitoring module 112 or another system determines that the patterns have changed, monitoring module 112 can generate a hash for the document.

Monitoring module 112 may also be configured to send generated signatures to document tracking module 142 and receive a response message from document tracking module 142. Monitoring module 112 may be further configured to take certain actions in response to any messages received from the document tracking module 142. These actions may involve the invocation, interaction or use of other applications residing on device 110 such as a browser, operating system, file system interface, e-mail application, etc. on the device 110 and/or actions to be taken on a content provisioning system, document tracking system, or even on another device 110.

Document tracking module 142 may be included in document tracking system 140. Document tracking system 140 may be deployed on physical computing devices residing at a particular location or may be deployed in a cloud. Thus, when document tracking system 140 is deployed in the cloud, the document tracking module 142 may be executing on a virtual machine provided in the cloud.

Document tracking module 142 may have access to a set of signatures 144 in data store 141 of the document tracking system 140. Each of the signatures 144 may correspond to a document 124 accessible by content provisioning module 122. Such signatures 144 may have been created for example, when the document was provided to content provisioning module 122 (e.g., ingested through an interface provided by content provisioning module 122 or document tracking module 142) and stored in the data store 121. A signature for a document may be created by, for example, hashing the content (or a portion thereof) of the document. It will be noted that multiple signatures 144 may be created from a document, for example, by hashing different portions of the document 124. Thus, for example, a signature may be created for every paragraph of a document, every page of a document, every heading of a document, every slide in a presentation, spreadsheets in a workbook, etc. The methodology used to create a signature 144 for a document 124 may be the same as that used by monitoring module 112 to create signature for a document (or portion thereof) such that, for example, if the monitoring module 112 were to create a signature for a particular document 124 that signature would be the same as the signature 144 corresponding to that document.

Document tracking module 142 may also have access to a set of actions 148 in data store 141 of the document tracking system 140. Actions 148 may be actions associated with a trigger such as a particular signature 144, a subset of signatures 144, all signatures 144, a particular statistical occurrence, a time of day, a particular user or device, or almost any other trigger desired.

These actions 148 may be specified for example, when the document was provided to content provisioning module 122 (e.g., ingested through an interface provided by content provisioning module 122 or document tracking module 142) and stored in the data store 121. Thus, using such an interface an action to be associated with a document may be specified by a user who provided the document 124 to the content provisioning module 122. As such, when the signature for the document is generated, the generated signature is stored in association with the action in actions 148 of data store 141.

Such actions 148 may include, actions that to be performed in conjunction with the computing device 110 from which a signature was received or an action to be performed in conjunction with another computer device. Such actions may include, for example, tracking the provisioning of a document or portions thereof, restricting or preventing particular users or types of users from accessing or distributing documents, notifying the user of a community associated with the document, prompting the user to take certain actions with respect to a document, sending a notification to another user or location (e.g., an security administrator), downloading a document from another location and presenting it to a user, etc. In some embodiments, a record of actions taken with respect to a document may be recorded, such that an audit trail is generated. An audit trail may indicate what versions were modified by whom, when, how often, or other information.

Document tracking module 142 is configured to receive a document signature from monitoring module 112 at a computing device 110. The document tracking module 142 is configured to determine if the received signature is in signatures 144 (e.g., comparing the received signature to the signatures in signatures 144). If the received signature is not in signatures 144 (e.g., is not one of document that has been brought under the management of content provisioning module 122) document tracking module 142 may send a message to monitoring module 112 that may prompt the user to upload the document associated with the signature. Alternatively, a message may be sent from document tracking module 142 to monitoring module 112 where the message is configured to cause the monitoring module 112 to send the document to document tracking module 142 substantially without involvement of the user of the device 110. When the document tracking module 142 receives such a document it may be stored in documents 124 and a signature 144 created for the document. In this manner, then, documents not previously under the management of content provisioning module 122 may be brought under the management or control of the content provisioning module 122, no matter the original source of the document (e.g., received from another user in an e-mail, accessed from a memory device such as USB drive, downloaded from a website, etc.).

Additionally, in one embodiment, document tracking module 142 may be configured to determine based on the received signature (or plurality of signatures) and the signatures 144 if a version of that document (e.g., the document accessed at user device 110) exists in documents 124. If a version of the document exists, document tracking module 142 may send a message to monitoring module 112 that may prompt the user to upload the version of the document associated with the signature. Alternatively, a message may be sent from document tracking module 142 to monitoring module 112 where the message is configured to cause the monitoring module 112 to send the version of the document to document tracking module 142 or content provisioning module 122 substantially without involvement of the user of the device 110. When the document tracking module 142 or content provisioning module 122 receives the version of the document it may be stored in documents 124 (e.g., replacing, or in addition to and associated with the previous version) and the signature of the new version of the document stored in signatures 144 (and possibly associated with the signature of the previous version of the document). In this manner, then, versioning of documents may be maintained, even if there are versions not previously under the management of content provisioning module 122 (e.g., that have been created or stored at devices 110 or created on another system and accessed at device 110).

Document tracking module 142 may compare signatures associated with two documents to determine that the two documents are, in fact, versions of the same document. For example, if there are two documents, each having multiple signatures, embodiments may compare the signatures and if the signatures meet defined criteria, determine that the documents are different versions of the same document. If, say, seven out of ten signatures match, document tracking module 142 may determine that the two documents are in fact different versions of the same document and notify content provisioning module 122 such that the documents are stored as versions.

In some embodiments, actions 148 associated with one version of a document may be associated with versions of the document. Thus, if a document is to be loaded from a client onto the file sharing system, the document may be checked to see if it is a new document or a version of an existing document. If the file is a version, embodiments may determine actions 148 associated with the original document and apply those same actions 148 to the document version being uploaded to the system. In some scenarios, on the other hand, automatically associating an action 148 with a new document version may not be desirable. For example, even if a previous version of a document was approved, automatically approving a new version of the document without review may be undesirable. Whether a particular action 148 applies to all versions of a document, a single version or a subset thereof may be configurable.

If, after receiving a signature from a monitoring module 112, document tracking module 142 determines that the received signature is one of signatures 144, it may determine if there are any actions 148 associated with the received signature. The document tracking module 142 may then initiate or execute the action 148. For example, an action may be to open a particular web page or to place a user in communication with a user. In this case, a message with instructions to provide a message to bring up a particular web page may be sent to monitoring module 112 from which the signature was received.

Document tracking module 142 may also be configured to maintain statistics 146 in data store 141. Statistics 146 may comprise statistics associated with monitoring modules 112 on user's computing devices 110. These statistics may also comprise statistics associated with a particular user computing device 110, statics associated with a set of computing devices (including all computing devices), statistics associated with a particular signature 144, statistics associated with all of signatures 144, and/or statistics 146 associated with a subset of signatures 144. Such statistics 146 may include, for example, how many times document tracking module 142 has received an access message corresponding to a particular signature 144 in a particular time period, how many times a particular device 110 has sent access message for any signatures 144 in a particular time period, which signatures 144 a monitoring module 112 has sent (e.g., what documents a user may be looking at), etc.

Accordingly, document tracking module 142 may also be configured to update statistics 146 (e.g., when a document signature is received from monitoring module 112, at some regular time intervals, on the occurrence of some other event or combination of events, etc.).

Similarly, then, document tracking module 142 may also be configured to evaluate statistics 146 to determine if any of the triggers for actions 148 associated with statistics 146 have occurred. As discussed above, such triggers may include for example, access by one device 110 to many signatures in a particular time period, access to one signature by many devices 110 in a time period, etc. If it is determined from statistics 146 that any triggers associated with an action 148 have occurred, the document tracking module may then initiate or execute the associated action 148. It may be noted that the action may include opening another application on a device 110.

It will be helpful here to illustrate various examples of scenarios that may be implemented using embodiments of a topology as discussed. For example, in one scenario a community of one or more users may be associated with a document. In such a scenario, an action may be to open a particular web page or a chat session with a particular person. Such an action may be associated with a signature for the document. Accordingly, when a user at a device 110 opens the document, the signature may be provided from the monitoring module 112 on the user's computer device 110 to the document tracking module 142. The document tracking module 142 determines the action(s) associated with the document and sends a message to the monitoring module 112 on the user's computing device 110 to open the particular web page or open a chat session on the user's computing device 110. Thus, for example, an employee opening a newsletter may be automatically directed to an interface for an associated community. As another example, a user downloading a template for initiating a grievance procedure within a company may be prompted (e.g., at their device) to establish a chat session or other communication with Human Resources (HR).

Additionally, communities (e.g., social communities, development communities, etc.) may be established by observing or tracking which users access a particular document or set of documents (e.g., in statistics 146 by observing which users are opening a particular signature). In such a scenario, an action 148 may be to prompt a user at a computing device to contact another user who has accessed the same document. Alternatively, contact may be automatically established between such users or a wide variety of other actions may occur with respect to the established community. In this way documents may be integrated into a community and associated, for example, with a social context.

In another scenario an action 148 may include providing external API calls. For example, if part of a workflow for a document includes getting the document approved, calls to a workflow API may be generated to progress the document through the workflow. The current status or summary of the workflow may be presented along with the document.

In another scenario, embodiments as described may be used to determine if a document opened by a user on his device 110 is outside of a controlled or approved environment (e.g., an environment of documents managed by content provisioning module 122). In other words, if a signature is received from monitoring module 112 that is not in signatures 144 associated with documents 124 it can be determined that the document has not previously been stored in documents 124 (or is an altered version of a document 124 that has been previously stored). In such cases, the user at the device 110 may be prompted to store the document or the monitoring module 112 may be instructed to automatically upload the document. In other embodiments, the user may be prompted as to whether they wish to store the document in a document management system (e.g., "This document is not stored in a document management system. Do you wish to store it now?"). These prompts could escalate based on rules finally reaching a mandatory 'store it now' level. Reports generated from this data could, for example, expose the level of information being moved around an organization both inside, and importantly, outside, of the appropriate systems.

In yet another scenario, actions can be associated with documents to implement access restrictions in association with a particular document. For example, when adding a document to content provisioning module 122, a user could specify that the document is not to be shared or exported, e-mailed, or place some other access restriction on the document. In such instances, the signature for the document may be associated with an action that prevents actions of that type.

In such a scenario, when a signature for a document is received at the document tracking module 142 and such an action 148 is determined for the document, an instruction to prevent this type of access may be sent to the monitoring module 112 from which the signature was received. As the monitoring module 112 may be configured to interact with the applications, operating system or hardware of the computing device 110 such that access to documents on the computing device 110 may be intercepted or otherwise monitored by the monitoring module 112, the monitoring module 112 may be configured to prevent the type of access associated with the action. Thus, for example, the monitoring module 112 may be able to prevent a user from attaching such a document to an e-mail, copying this document to another location using the file system on the computing device, editing the document, or other actions that may performed on documents in conjunction with the application, operating system etc. of a device.

In one specific case, it may be possible to implement a particular type of document sharing or distribution process by encrypting documents 124 in the data store 121 (or encrypting them in some other manner, such as when they are delivered from the content provisioning module 122). When such a document is accessed, the signature of the document may be provided to document tracking module 142. This signature may be associated with one or more actions 148 that serve to restrict access to the documents (e.g., an action that specifies no one is to access the document, that only a subset of users can access the document, etc.). If the user or computing device is authorized to access the document, or no other access restriction actions indicate the user is not allowed to access the document (e.g., the signature is not associated with a block access action, or an action specifying restriction of access to a group that the user is a part of, etc.), a key may be sent to the monitoring module 112 which decrypts the document and allows the user at the device 110 access the document. Alternatively, the key may be accessible by monitoring module 112 and an instruction to decrypt the document may be sent to the monitoring module 112 which decrypts the document in response to the instruction.

Again, to maintain control over such documents (e.g., to prevent a user from distributing a decrypted version of the document) accesses related to the decrypted document on the computing device 110 may be intercepted or otherwise monitored by the monitoring module 112 and the monitoring module 112 may be configured to prevent certain types of access such as preventing a user from attaching the decrypted document to an e-mail, copying the decrypted document to another location using the file system on the computing device, editing the decrypted document, or other actions that may be performed on the decrypted document in conjunction with the application, operating system, etc. of the device.

Thus, using embodiments as disclosed, a "for your eyes only" type document management/distribution process may be implemented. Furthermore, such a distribution process may be implemented substantially without impacting users' day-to-day functionality, but it would mean secure distribution of such document. Thus an advantage may be obtained whereby permission may move with the documents themselves and are not tied to where the documents are located. Accordingly, the permissions model may be extended to the user's computing devices regardless of the origin of content or where the content is stored, etc. Moreover, using such embodiments, the movement of documents through the environment (including to and from and among users) may be more easily tracked and appropriate actions taken or alerts raised.

Using certain embodiments then, the movement of documents around an environment (e.g., a business environment) may be tracked and versioned using such signatures. Such tracking and version control may not be restrained by the source of documents. No matter the source or origin of a document within an environment, if the document is being opened or distributed within the environment (even directly between users computing devices) it can be subject to versioning and control, backup, etc. Furthermore, the tracking may be recorded as part of an audit trail. To reduce processing time, monitoring module 112 may cache signatures and actions. Thus, when monitoring module 112 generates a signature for a document, monitoring module may check the signature against a local cache (e.g., disk or memory) of signatures to determine if the document is previously known. Additionally, monitoring module 112 may cache actions associated with documents such that when a user accesses a document, monitoring module 112 may determine if an associated action for the document is in cache.

It can also be noted that in some embodiments, rather than or in addition to monitoring module 112 determining that a document is associated with a computing device 110, content provisioning module 122, document tracking module 142 or other module running on a server may determine that a document is being requested by the computing device 110 and then communicate with that computing device 110 to inform the computing device 110 of the action to be taken (e.g., open a web link, etc.).

Figure 2:
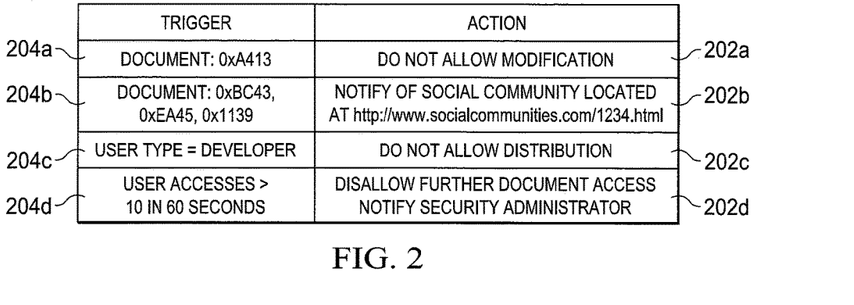
FIG. 2 is a block diagram illustrating one embodiment of actions and associated triggers.

Referring to FIG. 2, an example of one embodiment of associations of actions with triggers is depicted, proving several non-limiting examples. Such associations may, for example, be stored in a table or other data structure (e.g., in data store 141 of FIG. 1, a cache or other data store). In the example depicted, each action 202*a-d* is associated with a corresponding trigger 204*a-d* such that when a trigger occurs the corresponding action may be performed.

According to one embodiment, actions can be explicitly associated with unique document signatures. In this example, trigger 204*a* indicates a document signature of 0xA413, such that if this signature is received the action 202*a* of "Do Not Allow Modification" is triggered for that document. A message can then be sent to a monitoring module (e.g., monitoring module 112 of FIG. 1) so that the monitoring module prevents modification of the document at a user's computing device. While, in this example, the explicit association is illustrated in a single table, the document signature can be associated with the action through multiple tables that are related or through other mechanisms.

Trigger 204*b* indicates multiple document signatures of 0xBC43, 0xEA45 and 0x1139 such that if any one of these signatures is received the action 202*b* is triggered to notify the user at the user device of a social community at http://www.socialcommunities.com/1234.html. A message can then be sent to a monitoring module (e.g., monitoring module 112 of FIG. 1) so that the monitoring module displays the URL to the user or automatically opens the URL in a web browser. This can occur, for example, even if the user accessed the document through a word processor (or other application) from a file share or other source. Thus, the user may work on the document in a native application, while interacting with the community through a website or other applications. Consequently, the user can be provided with a social community experience without requiring that the user access the document through a website that provides social community features such as discussion, chat, commenting, etc.

Trigger 204*c* specifies a user type of "Developer" such that if a signature associated with developer access to a document is received from a monitoring module the action 202*c* of "Do Not Allow Distribution" is triggered. A message can then be sent to a monitoring module (e.g., monitoring module 112 of FIG. 1) so that the monitoring module can prevent other applications from sending (e.g., by e-mail) or uploading the associated document.

Trigger 204*d* specifies a statistical occurrence of "User Accesses>10 Documents in 60 Second" such that if statistics indicating that a user from whom a signature is received has accessed more than 10 documents in 60 seconds the actions 202*d* of "Do Not Allow Further Document Access" by the user and "Notify Security Administrator" are triggered. A message can then be sent to a monitoring module (e.g., monitoring module 112 of FIG. 1) so that the monitoring module can prevent other applications from accessing documents.

Figure 3:
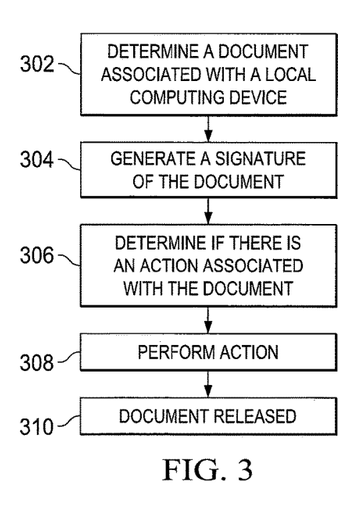
FIG. 3 is a flow diagram illustrating one embodiment of a method for document tracking and document driven actions.

FIG. 3 is a diagrammatic representation of one embodiment of a method for document tracking and document driven actions.

At step 302, the monitoring module can determine that a document is associated with the local computing device. This can occur, for example, by intercepting access requests or scanning local drives and memory. In some cases, the monitoring module may interact with an operating system's file system or other applications to determine documents accessed. According to one embodiment, for example, the monitoring module may intercept operating system requests to open or load files. In some cases, when requests to open or load a document are intercepted, monitoring module may temporarily store the requested document in memory while a hash is generated and signatures checked before releasing the document for access by other applications.

At step 304, the monitoring module can generate a hash or other signature of the document. This may include generating a plurality of hashes, such as a hash for every paragraph of a document, every page of a document, every heading of a document, every slide in a presentation, spreadsheets in a workbook, etc.

At step 306 the monitoring module can determine if there is an action associated with the signature of the document. According to one embodiment, monitoring module may check the signature against a cache of signatures and actions. The monitoring module may also submit the signature to a document tracking system and receive a message specifying an action to take with respect to a document.

The monitoring module, at step 308, can display messages to a user, interact with local computing device's operating system and other applications or undertake other processes to implement the action.

At step 310, the document may be released for use by another application (if not blocked by an action). According to one embodiment, the monitoring module can pass the document to the computing device's operating system so that the document may be opened by another application.

Figure 4:
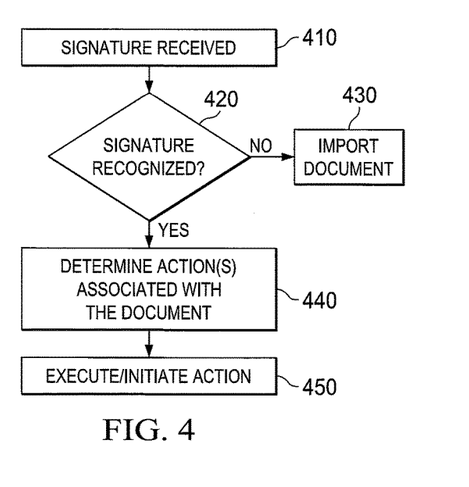
FIG. 4 is a flow diagram illustrating another embodiment of a method for document tracking and document driven actions.

Moving now to FIG. 4, one embodiment of a method for document tracking and document driven actions is depicted. At step 410 a signature may be received. This signature may have been created, for example, by a monitoring module on a user device (e.g., monitoring module 112 of FIG. 1) when a user accesses a document on their device. The monitoring module may then send the signature in response to the user accessing the document. At step 420, then, it can be determined if the received signature is recognized. In one embodiment, this may comprise determining if the received signature is one of a set of signatures associated with known documents. If the signature is not recognized, at step 430 a message with an instruction to import the document may be sent. Such an instruction may prompt the user to upload the document associated with the signature. Alternatively, the instruction may be configured to cause the document to be uploaded from a user's device without involvement of the user.

If the signature is recognized, at step 440 it can be determined if there is an action associated with the signature. Such actions may include actions that are to be performed in conjunction with a device from which a signature was received or an action to be performed in conjunction with another computer device. For example, actions may include tracking the provisioning of a document or portions thereof, restricting or preventing particular users or types of users from accessing or distributing documents, notifying the user of a community associated with the document, prompting the user to take certain actions with respect to a document, sending a notification to another user or location (e.g., an security administrator), downloading a document from another location and presenting it to a user, etc.

If there is an action, at step 450 the action may executed or initiated. In one embodiment, executing or initiating the action may include sending a message to a system with instructions to initiate or execute an action. Alternatively, a communication (e.g., an e-mail or alerts) may be sent to an appropriate destination.

Figure 5A:
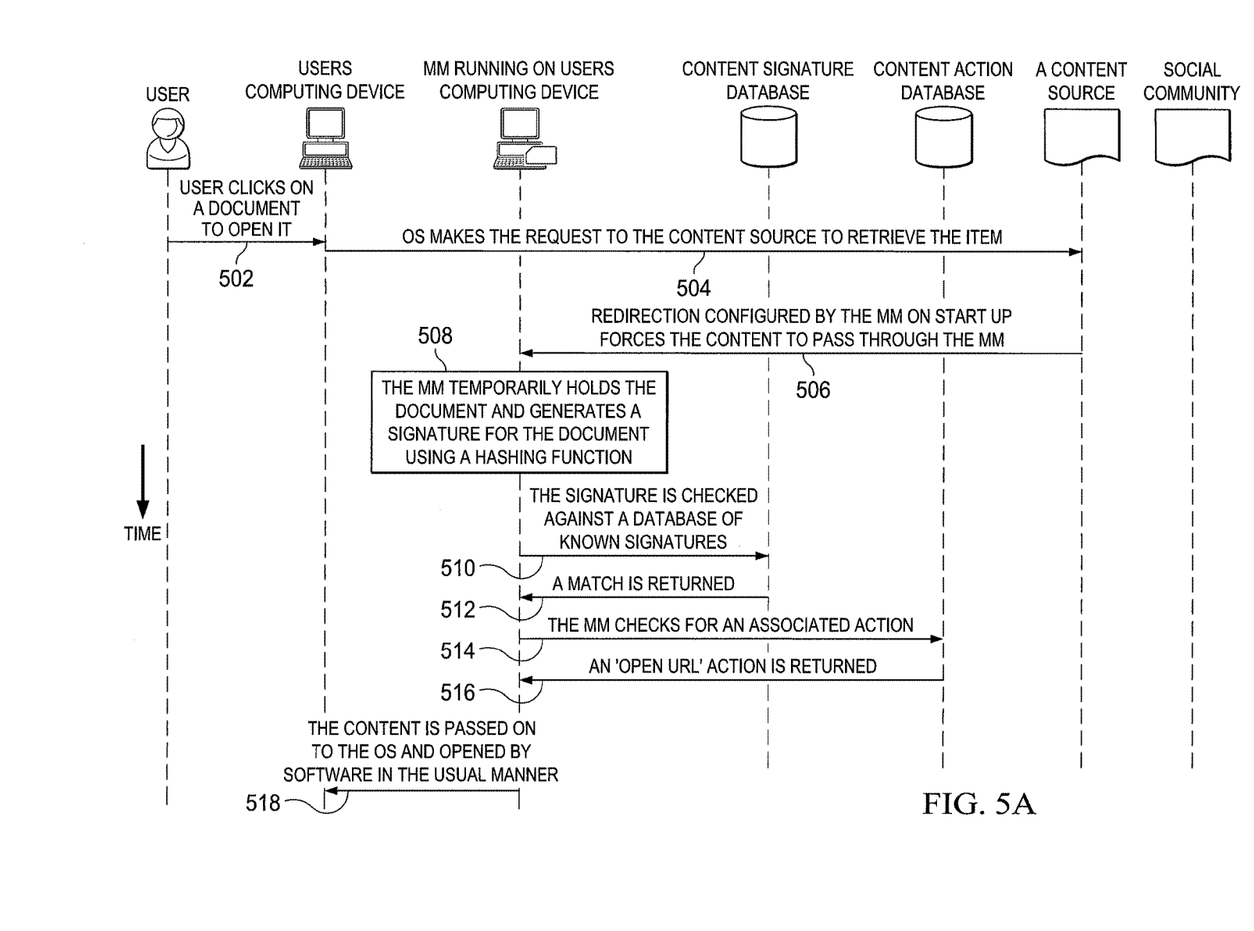
FIGS. 5A and 5B are diagrams of one example of a scenario for document driven action.
Figure 5B:
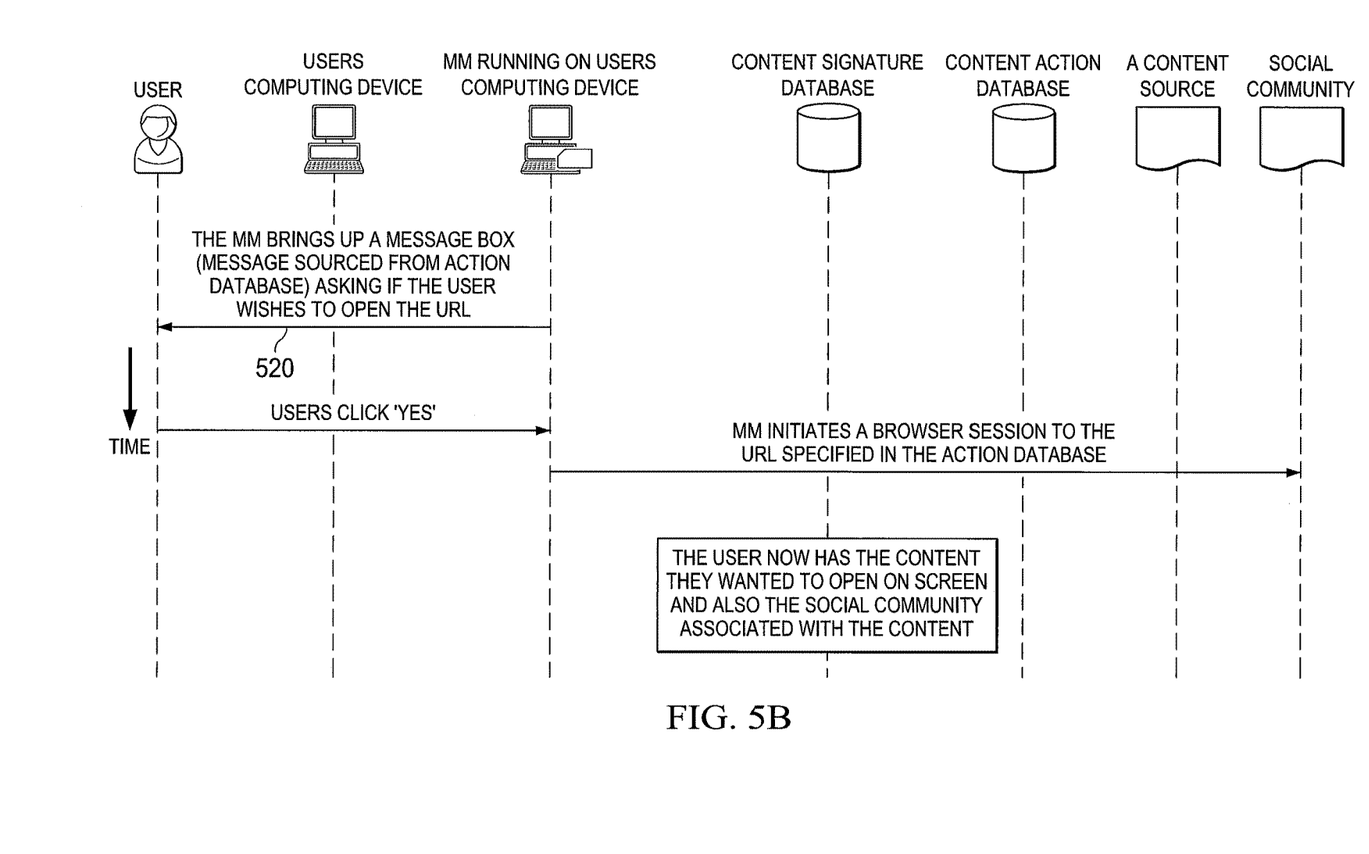

FIGS. 5A and 5B graphically depict one example scenario of the use of document tracking system in associating a document (content) with a social community.

At step 502, a user clicks on a document to open the document stored at a content source (e.g., locally, from a shared file system, at a content provisioning system or other content source). The underlying operating system of the user's computing device attempts to access the data and makes a request to open the file from the content source (step 504).

The flow of data may be intercepted or redirected by a monitoring module (MM) (e.g., monitoring module 112 of FIG. 1) on the user's computing device as the data is returned to the user's computing device (step 506). The document can be temporarily held by the monitoring module (step 508).

A signature may be generated and that signature checked against a database of known signatures (e.g., signatures 144 of FIG. 1) (step 510). The database may be a local database or remote database.

A match may be found (step 512), which may indicate that for that signature, there is an associated action. The monitoring module may check a local or remote content action database (e.g., actions 148 of FIG. 1) for an associated action (step 514). In this example, an associated action of "Open URL" is returned (step 516). An action may be returned as a script executed by the monitoring module or an action may be returned with a reference to an action in a library of predetermined actions.

Because the action does not prevent a user from opening the document, the monitoring module passes the document to the operating system so that it can be opened by an application (step 518).

At step 520, the monitoring module displays a message to the user asking if the user wishes to open the URL (or proceeds to automatically open the URL). If the user clicks "Yes," the monitoring module can interact with the operating system and a browser to initiate a browser session to the URL specified in the content action database. The user now has opened the requested document and the URL associated with the content, such as the URL for a social community.

The images depicted in FIGS. 5A and 5B illustrate a simplified embodiment. For example, in other embodiments, multiple short signatures may be taken throughout the document and compared to the content signature database. In some embodiments, a cache may contain a signature or multiple signatures locally and the system may search for a match within the local cache to see if a document is the same as a document previously loaded from the file sharing system. The cache may also contain actions associated with documents.

Figure 6:
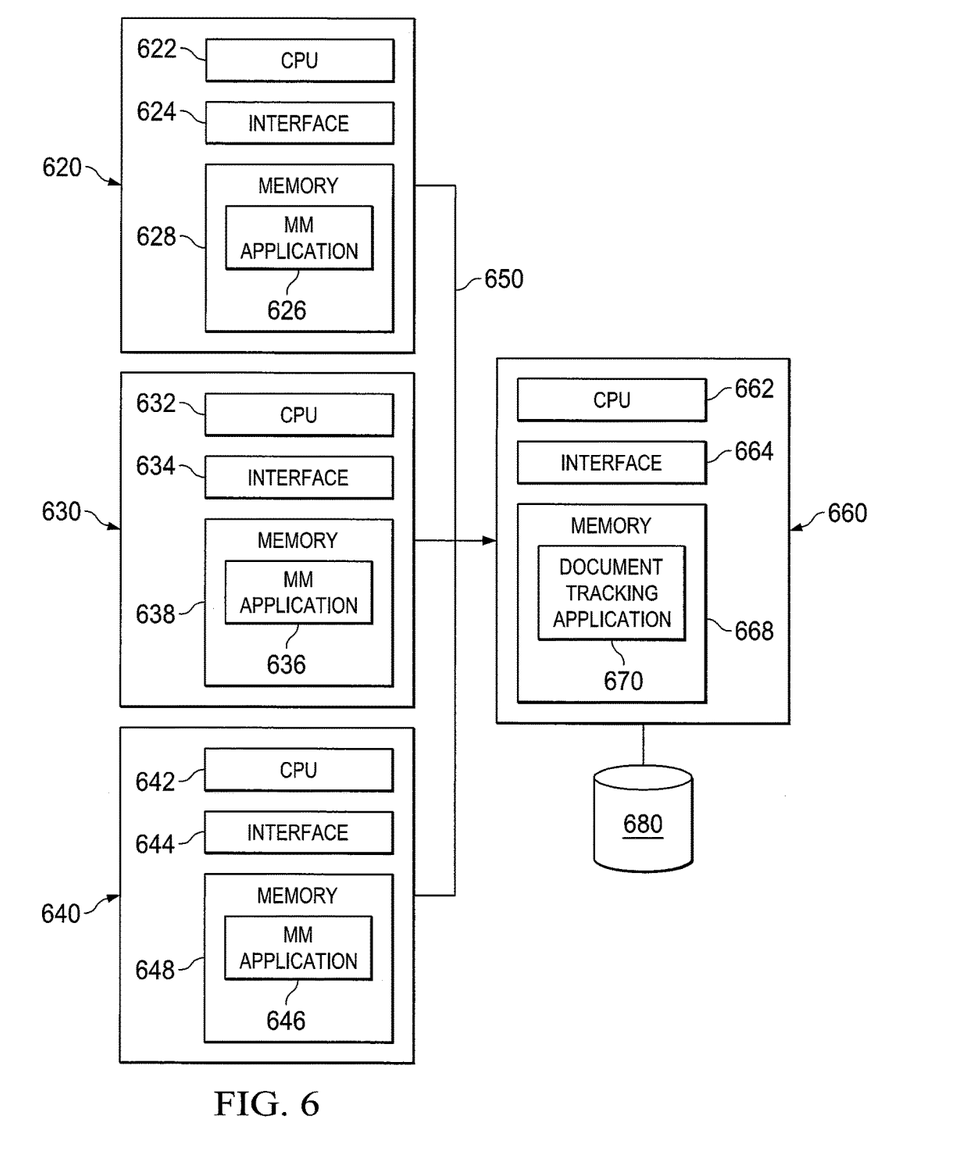
FIG. 6 is a diagrammatic representation of one embodiment of a document tracking system that includes user computing devices and one or more server machines.

FIG. 6 is a diagrammatic representation of one embodiment of a system 600 that includes user computing devices 620, 630 and 640 and one or more server machines such as server machine 660. As illustrated in FIG. 6, client computing devices 620, 630, and 640 and server machine 660 can be connected via standard transmission channel 650, which may be a wired and/or wireless network including a local area network (LAN), wide area network (WAN), the Internet, or other wired and/or wireless network.

Client computing devices 620, 630 and 640 in system 610 can be a computing device including a central processing unit ("CPU") (e.g., CPU 622, CPU 632, and CPU 642), a network connection device (e.g., network interface 624, network interface 634, and network interface 644), and a non-transitory computer readable medium (e.g., computer readable medium 628, computer readable medium 638, and computer readable medium 648), each of which can comprise any combination of a primary memory, a secondary memory, a random access memory (RAM), a read only memory (ROM), and/or a magnetic storage device such as a hard drive (HD) or other non-transitory computer readable storage medium. Each computer readable medium (e.g., computer readable medium 628, computer readable medium 638, and computer readable medium 648) may store a number of computer programs and may further locally store documents created or saved by a user. In particular, each computer readable medium can store a monitoring module application (e.g., monitoring module application 626, monitoring module application 636, and monitoring module application 646). Each monitoring module application may be a stand-alone application, a portion of an application or a web browser or other application capable of communicating with a server to participate in document tracking. Each user computing device can establish network communications through transmission channel 650.

Server 660 can include a plurality of server computer components, including a processor 662, a network connection device 664, and a non-transitory computer readable medium 668. Computer readable medium 668 can comprise any combination of a primary memory, a secondary memory, a RAM, a ROM, and/or a magnetic storage device such as a HD or other non-transitory computer readable storage medium. Computer readable medium 668 may store a number of computer programs. As shown in FIG. 6, server 660 stores document tracking server application 670 for communicating with monitoring module applications located on user devices such as client computing devices 620, 630, and 640 over transmission channel 650, including uploading documents found locally stored on client computing devices 620, 630 and 640. Server 660 can also act as a content provisioning system that provides content to user computing devices.

Through execution of document tracking application 670, server 660 may provide a monitoring module to monitor documents store locally by users on computing devices 620, 630 and 640. Accordingly, document tracking application 670 may access one or more databases 680 of documents, signature data, actions or other information. In some embodiments, server 660 may service requests for signature data from monitoring module applications running on server 660 or other systems. Server 660 may also act as one or more of a proxy server, backend system or other server or system.

Routines, methods, steps, operations or portions thereof described herein can be implemented through control logic, including computer executable instructions stored on a computer readable medium, hardware, firmware or a combination thereof. The control logic can be adapted to direct an information processing device to perform a set of steps disclosed in the various embodiments. Some embodiments may be implemented by using software programming or code in one or more digital computers, by using application specific integrated circuits, programmable logic devices, field programmable gate arrays, optical, chemical, biological, quantum or nanoengineered systems, components and mechanisms. Based on the disclosure and teachings provided herein, a person of ordinary skill in the art will appreciate other ways and/or methods to implement the invention.

Computer executable instructions or code can be stored in a computer-readable medium and can be operated on by a processor to permit a computer to perform functions, steps, operations, methods, routines, operations or portions thereof described herein. Any suitable language can be used including C, C++, Java, JavaScript, assembly language or other programming or scripting code. Different programming techniques can be employed such as procedural or object oriented. In an embodiment, HTML may utilize JavaScript to provide a means of automation and calculation through coding.

Any particular step, operation, method, routine, operation or portion thereof can execute on a single computer processing device or multiple computer processing devices, a single computer processor or multiple computer processors. Data may be stored in a single storage medium or distributed through multiple storage mediums, and may reside in a single database or multiple databases (or other data storage). The sequence of operations described herein can be interrupted, suspended, or otherwise controlled by another process, such as an operating system, kernel, etc. The routines can operate in an operating system environment or as stand-alone routines.

A "computer-readable medium" may be any type of data storage medium that can store computer instructions, including, but not limited to read-only memory (ROM), random access memory (RAM), hard disks (HD), data cartridges, data backup magnetic tapes, floppy diskettes, flash memory, optical data storage, CD-ROMs, or the like. The computer readable medium can be, by way of example, only but not by limitation, an electronic, magnetic, optical, electromagnetic, infrared, or semiconductor system, apparatus, system, device, or computer memory. The computer readable medium may include multiple computer readable media storing computer executable instructions, such as in a distributed system or instructions stored across an array.

A "processor" includes any hardware system, hardware mechanism or hardware component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will be understood for purposes of this disclosure that a service or module is one or more computer devices, configured (e.g., by a computer process or hardware) to perform one or more functions. A service may present one or more interfaces which can be utilized to access these functions. Such interfaces include APIs, interfaces presented for a web services, web pages, remote procedure calls, remote method invocation, etc.

Embodiments can be implemented in a computer communicatively coupled to a network (for example, the Internet, an intranet, an internet, a WAN, a LAN, a SAN, etc.), another computer, or in a stand-alone computer. As is known to those skilled in the art, the computer can include a central processing unit ("CPU") or processor, memory (e.g., primary or secondary memory such as RAM, ROM, HD or other computer readable medium for the persistent or temporary storage of instructions and data) and one or more input/output ("I/O") device(s). The I/O devices can include a keyboard, monitor, printer, electronic pointing device (for example, mouse, trackball, stylus, etc.), touch screen or the like. In embodiments, the computer has access to at least one database on the same hardware or over the network.

Steps, operations, methods, routines or portions thereof of the present invention may be implemented on one computer or shared among two or more computers. In one embodiment, the functions of the present invention may be distributed in the network. Communications between computers implementing embodiments of the invention can be accomplished using any electronic, optical, radio frequency signals, or other suitable methods and tools of communication in compliance with network and other communications protocols.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive or and not to an exclusive or. That is, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present).

As used herein, a term preceded by "a" or "an" (and "the" when antecedent basis is "a" or "an") includes both singular and plural of such term unless the context clearly dictates otherwise. Also, as used in the description herein, the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

In the foregoing specification, the invention has been described with reference to specific embodiments. However, one of ordinary skill in the art appreciates that various modifications and changes can be made without departing from the scope of the invention. Accordingly, the specification, including the Summary and Abstract, and figures are to be regarded in an illustrative rather than a restrictive sense, and all such modifications are intended to be included within the scope of invention.

What is claimed is:

1. A method for document driven actions, comprising:
   maintaining a set of document signatures electronically generated from electronic documents tracked by a document tracking system and a set of associated actions, each action in the set of associated actions associated with at least one document signature in the set of document signatures;
   at a monitoring module at a client computing device, detecting a request to access an electronic document at the client device;
   generating, at the monitoring module, a document signature for the electronic document;
   communicating the electronic document signature to the document tracking system;
   receiving, at the document tracking system from the client computing device over a network, the document signature for the electronic document;
   determining, at the document tracking system, that the received document signature matches one of the set of signatures;
   determining, at the document tracking system, an action associated with the received document signature;
   sending a message over the network from the document tracking system to the monitoring module, the message including information about the determined action;
   receiving the message at the monitoring module specifying the determined action; and
   in response to receiving the message, automatically performing the action at the monitoring module.

2. The method of claim 1, wherein the action comprises preventing the electronic document from being modified at the client computing device.

3. The method of claim 1, wherein the document tracking system determines that the client computing device is associated with a user of a type of users, and the action comprises restricting access to at least one portion of the electronic document at the client computing device.

4. The method of claim 1, wherein the action comprises the monitoring module recording a user of the client computing device's interactions with respect to the electronic document.

5. The method of claim 1, wherein the action comprises prompting a user of the client computing device of actions to be taken with respect to the electronic document.

6. The method of claim 1, wherein the action comprises sending a notification of the document request to another user.

7. The method of claim 1, further comprising providing an interface to the document tracking system that allows a user to associate actions with the electronic document.

8. The method of claim 1, wherein the monitoring module is further configured to temporarily prevent the user from opening the electronic document until receiving the message from the document tracking system that specifies the action.

9. The method of claim 1, wherein the action comprises initiating contact with members of a social community.

10. The method of claim 1, further comprising redirecting the electronic document to the monitoring module.

11. A system for document driven actions, comprising:
a client computing device comprising a monitoring module; and
a document tracking system in communication with the client computing device, wherein:
the monitoring module is configured to:
   detect a request to access an electronic document at the client computing device;
   generate a document signature for the electronic document; and
   communicate the electronic document signature to the document tracking system;
the document tracking system is configured to:
   maintain a set of document signatures electronically generated from electronic documents and a set of associated actions, each action in the set of associated actions associated with at least one document signature in the set of document signatures;
   receive the document signature for the electronic document from the client computing device over a network;
   determine that the received document signature matches a signature in the set of signatures;
   determine an action associated with the received document signature; and
   send a message over the network to the monitoring module, the message including information about the determined action; and
the monitoring module is further configured to:
   receive the message specifying the determined action; and
   in response to receiving the message, automatically perform the action at the monitoring module.

12. The system of claim 11, wherein the action comprises preventing the electronic document from being modified at the client computing device.

13. The system of claim 11, wherein the document tracking system determines that the client computing device is associated with a user of a type of users, and the action comprises restricting access to at least one portion of the electronic document at the client computing device.

14. The system of claim 11, wherein the action comprises the monitoring module recording a user of the client computing device's interactions with respect to the electronic document.

15. The system of claim 11, wherein the action comprises prompting a user of the client computing device of actions to be taken with respect to the electronic document.

16. The system of claim 11, wherein the action comprises sending a notification of the document request to another user.

17. The system of claim 11, further comprising providing an interface to the document tracking system that allows a user to associate actions with the electronic document.

18. The system of claim 11, wherein the monitoring module is further configured to temporarily prevent the user from opening the electronic document until receiving the message from the document tracking system that specifies the action.

19. The system of claim 11, wherein the action comprises initiating contact with members of a social community.

20. The system of claim 11, further comprising redirecting the electronic document to the monitoring module.

\* \* \* \* \*